United States Patent
Mizukoshi

(10) Patent No.: US 11,929,998 B2
(45) Date of Patent: Mar. 12, 2024

(54) CONTROL APPARATUS, IN-VEHICLE COMMUNICATION SYSTEM, COMMUNICATION CONTROL METHOD AND PROGRAM

(71) Applicant: NEC CORPORATION, Tokyo (JP)

(72) Inventor: Yasuhiro Mizukoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 707 days.

(21) Appl. No.: 17/040,086

(22) PCT Filed: Aug. 30, 2018

(86) PCT No.: PCT/JP2018/032229
§ 371 (c)(1),
(2) Date: Sep. 22, 2020

(87) PCT Pub. No.: WO2019/187204
PCT Pub. Date: Oct. 3, 2019

(65) Prior Publication Data
US 2021/0029103 A1   Jan. 28, 2021

(30) Foreign Application Priority Data
Mar. 28, 2018  (JP) .................. 2018-061358

(51) Int. Cl.
*H04L 9/40* (2022.01)
*G06F 8/65* (2018.01)

(52) U.S. Cl.
CPC .............. *H04L 63/08* (2013.01); *G06F 8/65* (2013.01); *H04L 63/18* (2013.01)

(58) Field of Classification Search
CPC ....... H04L 63/18; H04L 12/462; H04L 63/08; H04L 67/12; H04L 2012/40273; G06F 8/65
(Continued)

(56) References Cited

U.S. PATENT DOCUMENTS

| 5,485,520 A * | 1/1996 | Chaum ................ G06Q 20/367 |
| | | 342/51 |
| 9,215,228 B1 * | 12/2015 | Zhang ................. H04L 63/0884 |
| 2017/0093866 A1 * | 3/2017 | Ben-Noon ............. H04L 67/12 |

FOREIGN PATENT DOCUMENTS

| JP | 2003-324459 A | 11/2003 |
| JP | 2016-111477 A | 6/2016 |

(Continued)

OTHER PUBLICATIONS

"Open Flow Switch Specification", Open Networking Foundation, Version 1.5.1 (Protocol version 0x06), https://3vf60mmveg1g8vzn48g2o71a-wpengine.netdena-sst.com/wp-content/uploads/2014/10/openflow-switch-v1.5.1.pdf, Mar. 2015, 283 pages.

(Continued)

*Primary Examiner* — Benjamin A Kaplan
(74) *Attorney, Agent, or Firm* — Sughrue Mion, PLLC

(57) ABSTRACT

A control apparatus includes: at least one memory configured to store instructions; and at least one processor configured to execute the instructions to: control communication in a vehicle by setting a control entry to a plurality of switches relaying, by referring to the control entry, a packet input to and output from an ECU installed in the vehicle, and perform an authentication processing for a device attempting communication with the ECU via any one of the plurality of switches. The control sets, to the switch, a temporary control entry realizing the communication between the device and ECU when authentication of the device is successful.

19 Claims, 14 Drawing Sheets

(58) Field of Classification Search
USPC .............................................................. 726/4
See application file for complete search history.

(56) References Cited

FOREIGN PATENT DOCUMENTS

| | | |
|---|---|---|
| JP | 2017-005617 A | 1/2017 |
| JP | 2017-184052 A | 10/2017 |

OTHER PUBLICATIONS

International Search Report for PCT/JP2018/032229 dated Nov. 20, 2018.
Written Opinion for PCT/JP2018/032229 dated Nov. 20, 2018.

\* cited by examiner

CONTROL APPARATUS, IN-VEHICLE COMMUNICATION SYSTEM, COMMUNICATION CONTROL METHOD AND PROGRAM

CROSS-REFERENCE TO RELATED APPLICATIONS

This application is a National Stage of International Application No. PCT/JP2018/032229 filed Aug. 30, 2018, which claims priority under U.S.C. § 119(a) to Japanese Patent Application No. JP2018-061358 filed on Mar. 28, 2018.

FIELD

Description of the Related Application

The present invention claims the benefit of foreign priority of Japanese Patent Application No. 2018-061358 (filed on Mar. 28, 2018), which is incorporated herein and described by reference in its entirety.
The present invention relates to a control apparatus, in-vehicle communication system, communication control method and program.

BACKGROUND

Patent Literature 1 discloses a vehicle-mounted gateway (called "GWECU") which performs protocol conversion between an ECU corresponding to a CAN and an ECU corresponding to a communication protocol other than the CAN. Also, this Literature describes that a gateway monitors a voltage between the ECU corresponding to the CAN and the gateway or a communication cycle period from the ECU corresponding to the CAN in order to prevent that an illegal message is relayed from the ECU corresponding to CAN to an ECU corresponding to another protocol. Here, "CAN" is an abbreviation of "Controller Area Network" and "ECU" is an abbreviation of "Electronic Control Unit".

Patent Literature 2 discloses a configuration that connects two vehicle-mounted gateways by two communication paths via an Ethernet (hereinafter, "Ethernet" is a registered trademark) path and continues communication by using the one communication path when trouble of the other communication path occurs.

In addition, in recent years, a technology called SDN (Software Defined Network) that realizes virtualization of network, by using software is known. Non-Patent Literature 1 is a specification of OpenFlow Switch which is used in a case of constituting the SDN.

Patent Literature 1: Japanese Patent kokai Publication No. 2016-111477 A
Patent Literature 2: Japanese Patent kokai Publication No. 2017-5617A
Non-Patent Literature 1: OpenFlow Switch Specification Version 1.5.1 (Protocol version 0x06), ONF, [online], [search on March 16, Heisei 30 (2018)], Internet <URL: https://3vf60mmveq1 g8vzn48q2o71a-wpengine.netdna-ssl.com/wp-content/uploads/2014/10/openflow-switch-v1.5.1.pdf>

SUMMARY

Following analyses are made from a point of the present invention. As described in Background of Patent Literature 1, various standards for realizing an in-vehicle LAN (Local Area Network) have been proposed. However, there is a problem that the entire harness length becomes long, since the more a number of corresponding communication protocols increases, the more a communication line between an ECU and gateway is required in a method arranging a gateway such as Patent Literature 1.

There is a room to shorten the harness length, since two GW-ECUs have a protocol conversion function and an Ethernet bus is connected between the GW-ECUs in a scheme of Patent Literature 2. However, in the scheme of Patent Literature 2, there is a problem that it cannot adopt security measures adopted by the scheme of Patent Literature 1.

In addition, it is assumed that many ECUs will be installed in a next generation vehicle and they will cooperate with each other and play a critical role represented by autonomous driving. Therefore, it is necessary to perform diagnosis and program update (also called "reprogramming") for these many ECUs efficiently and appropriately. On the other hand, it is necessary to prevent that an unsuitable device or a malicious device is connected by pretending diagnosis, too.

It is an object of the present invention to provide a control apparatus, in-vehicle communication system, communication control method and program that can contribute reduction of a security risk while securing efficiency of diagnosis or reprograming of an ECU installed in a vehicle.

According to a first aspect, there is provided a control apparatus including: a control part which controls communication in a vehicle by setting a control entry to a plurality of switches relaying, by referring to the control entry, a packet input to and output from an ECU installed in the vehicle, and an authentication execution part which performs an authentication processing for a device attempting communication with the ECU via any one of the plurality of switches, wherein the control part sets, to the switch, a temporary control entry realizing the communication between the device and ECU when authentication of the device is successful.

According to a second aspect, there is provided an in-vehicle communication system including: a plurality of switches relaying a packet input to and output from an ECU installed in a vehicle by referring to a control entry, and the above control apparatus.

According to a third aspect, there is provided a communication control method in a control apparatus including a control part that controls communication in a vehicle by setting a control entry to a plurality of switches relaying, by referring to the control entry, a packet input to and output from an ECU installed in the vehicle, the method comprising: by the control apparatus, performing an authentication processing for a device attempting communication with the ECU via any one of a plurality of switches, and setting, to the switch, a temporary control entry realizing the communication between the device and ECU when authentication of the device is successful. In addition, the method is coupled with a specified machine which is a control apparatus realizing communication in a vehicle by setting a control entry to a switch(es).

According to a fourth aspect, there is provided a computer program for realizing a function(s) of the above control apparatus. In addition, this program can be recorded in a computer readable (non-transitory) recording medium. Namely, the present invention can also be embodied as a computer program product.

According to the present invention, it is possible to contribute to reduction of a security risk while securing efficiency of diagnosis and reprogramming of an ECU installed in a vehicle.

PREFERRED MODES

Firstly, an overview of an exemplary embodiment of the present invention will be explained by using figures. In addition, drawing reference signs added to the overview are signs added to each element as an example for convenience to help the understanding, and it is not intended that the present invention is limited to an illustrated exemplary embodiment. Further, a connection path between blocks in figures or the like referring to the following description includes both bidirectional and unidirectional. One-way arrow indicates schematically flow of primary signal (data), and does not excluded bidirectionality. In addition, in a connection point of input and output of each block in figures, a port or interface exist, but explicit description is omitted in figures.

Figure 1:
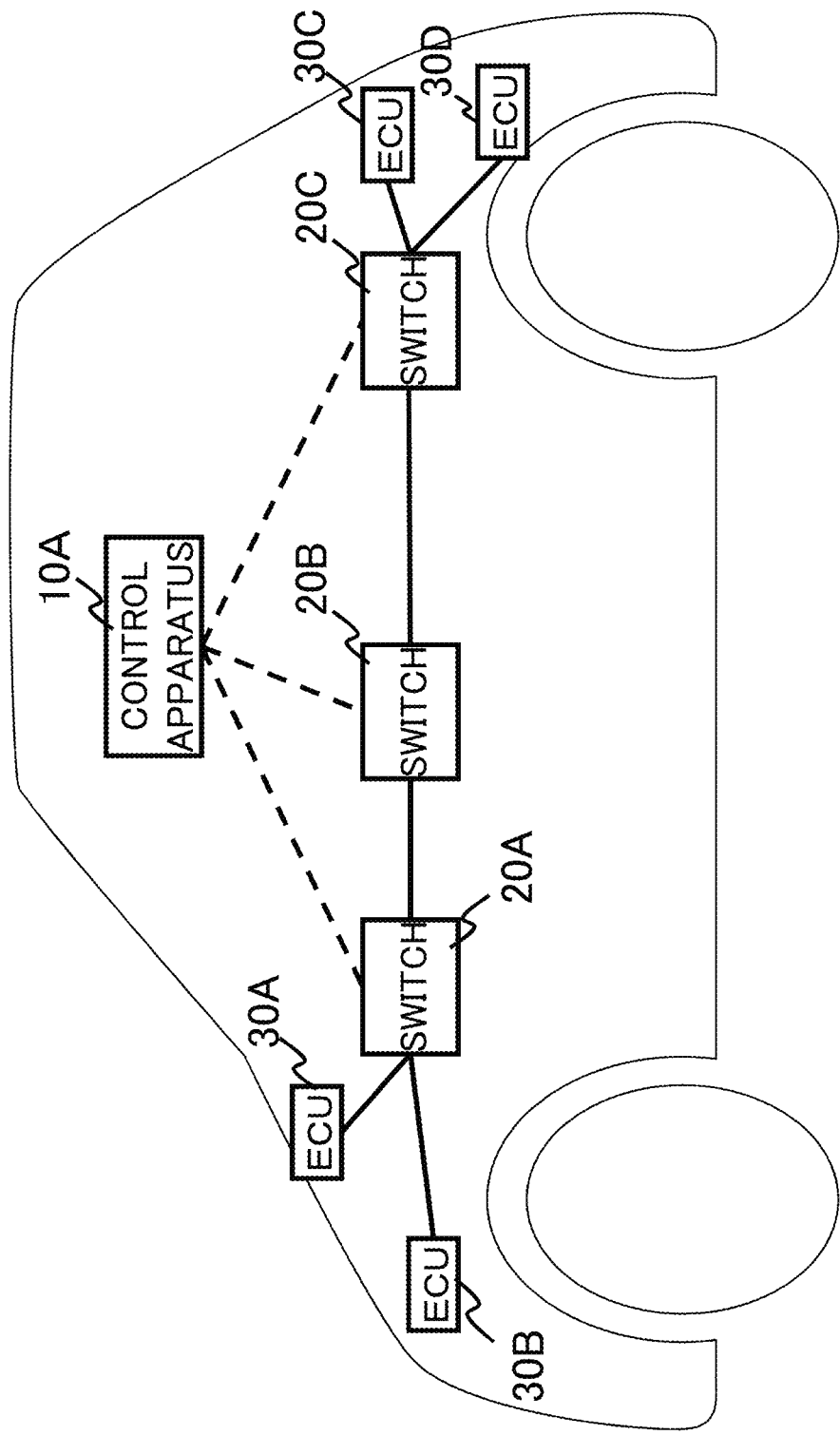
FIG. 1 is a diagram illustrating a configuration of an exemplary embodiment of the present invention.

In an exemplary embodiment, as illustrated in FIG. 1, the present invention is realized by a control apparatus 10A which controls a plurality of switches 20A to 20C (hereinafter, referred to as "switch 20" as far as it is not necessary to distinguish the switches 20A to 20C especially) installed in a vehicle by referring to a control entry.

More concretely, the plurality of switches 20 relays packets input to and output from ECUs 30A to 30D (hereinafter, referred to as an "ECU 30" as far as it is not necessary to distinguish the ECUs 30A to 30D especially) installed in the vehicle by referring to the control entry. These packets include a communication packet between the ECUs, a packet between the ECU and a sensor, or the like. In addition, though it is described as that a number of ECU 30 is four in an example of FIG. 1, the number of ECU is not limited to this number.

Figure 2:
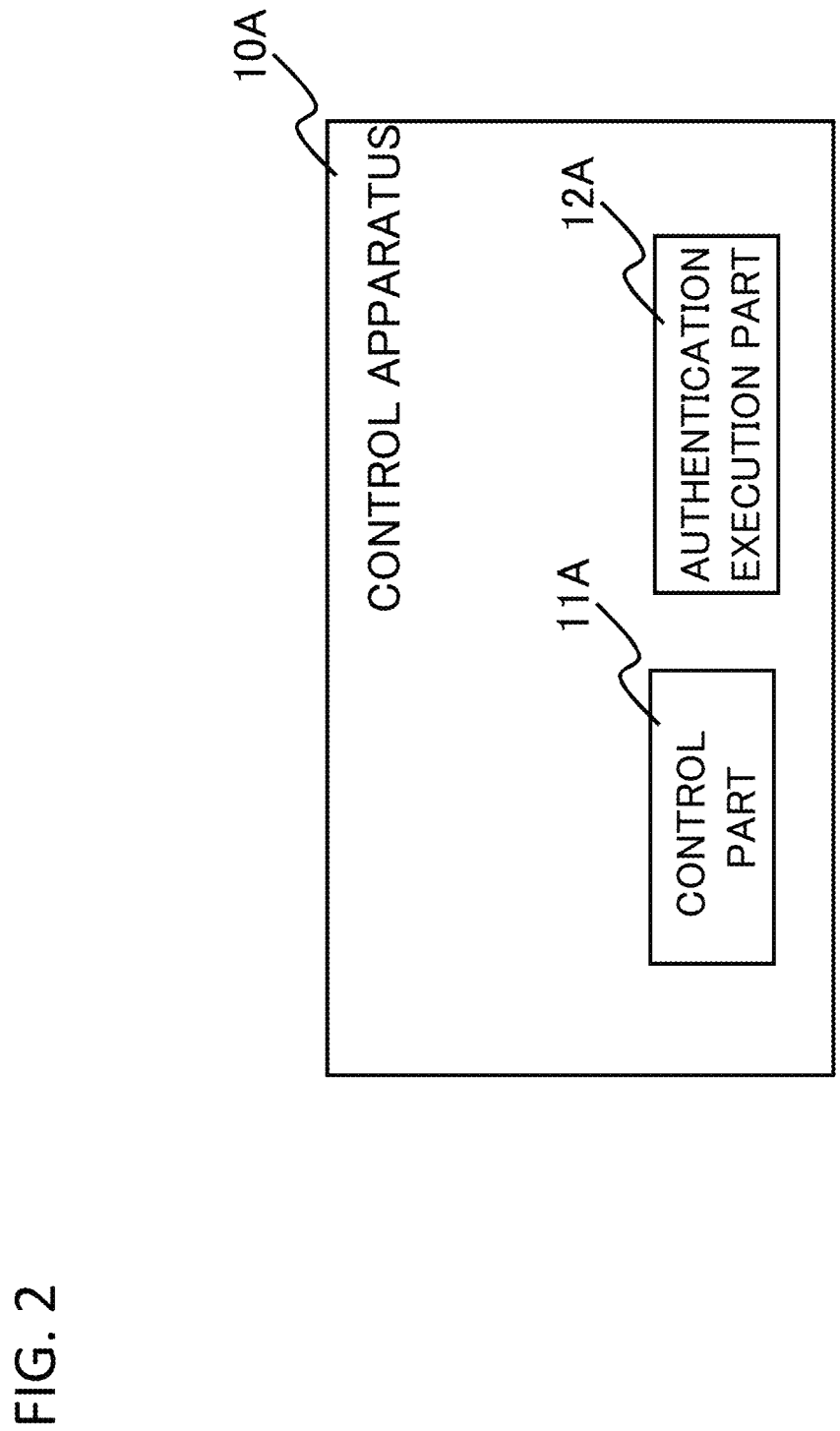
FIG. 2 is a diagram illustrating a configuration of a control apparatus in an exemplary embodiment of the present invention.

And, as illustrated in FIG. 2, the control apparatus 10A includes a control part 11A and authentication execution part 12A. And, the control part 11A controls communication in the vehicle by setting the control entry to the switch 20. In addition, it is not necessary that the ECU 30 communicates with other all ECU(s) and it is enough to communicate with other ECU(s) relating to an own function or with the sensor. In this point of view, the control part 11A may divide a network constituted by the switch 20 into a plurality of domains.

On the other hand, the authentication execution part 12A performs an authentication processing for a device attempting communication with the ECU 30 via any one of the plurality of switches 20. Further, as a method of the authentication processing, there may be a simple method of requesting input of a PIN code, or a method of requesting input of serial number or password distributed to a legitimate (allowable) user in advance. Also, upon this authenticating, the authentication execution part 12A may perform the authentication processing in association with an external authentication server. In this case, the authentication execution part 12A executes authentication by transmitting information of the device to the external authentication server (a predetermined authentication apparatus) and receiving an authentication result from the authentication server.

Figure 3:
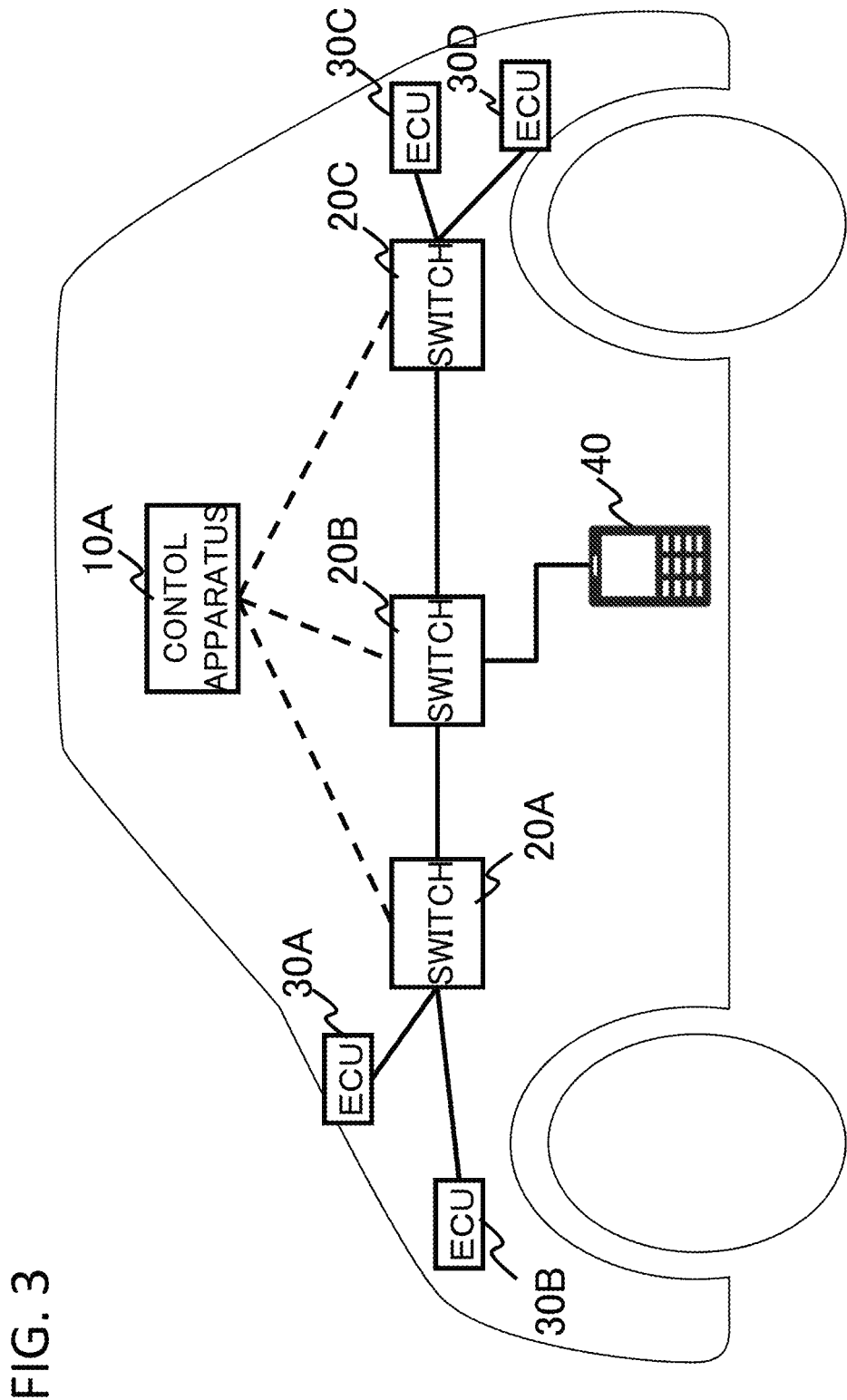
FIG. 3 is diagram for explaining an operation of a control apparatus in an exemplary embodiment of the present invention.

For example, as illustrated in FIG. 3, if it is assumed that a device 40 is connected via the switch 20B, the authentication execution part 12A of the control apparatus 10A executes the authentication processing for the device 40. When the authentication is in failure here, the control part 11A of the control apparatus 10A does not set a temporary control entry realizing communication between the device 40 and ECU 30. Herewith, it is possible to prevent that an illegal device transmits a packet or the like to a network in the vehicle.

On the other hand, when the authentication of the device 40 is successful, the control apparatus 10A sets the temporary control entry realizing the communication between the device 40 and ECU 30 to the control part 11A. Herewith, it is possible that a legitimate device communicates with the ECU and performs predetermined inspection and read out of data. Also, it is possible that some of the device transmits a data for update to the ECU 30 side and performs update of a program ("reprogramming") in the ECU 30. In addition, the temporary control entry means impermanent and may be deleted by the control apparatus 10A when a required communication is terminated, furthermore, a hard timeout value may be set to the control entry, and the control entry may be deleted automatically after a predetermined time period has elapsed.

First Exemplary Embodiment

Figure 4:
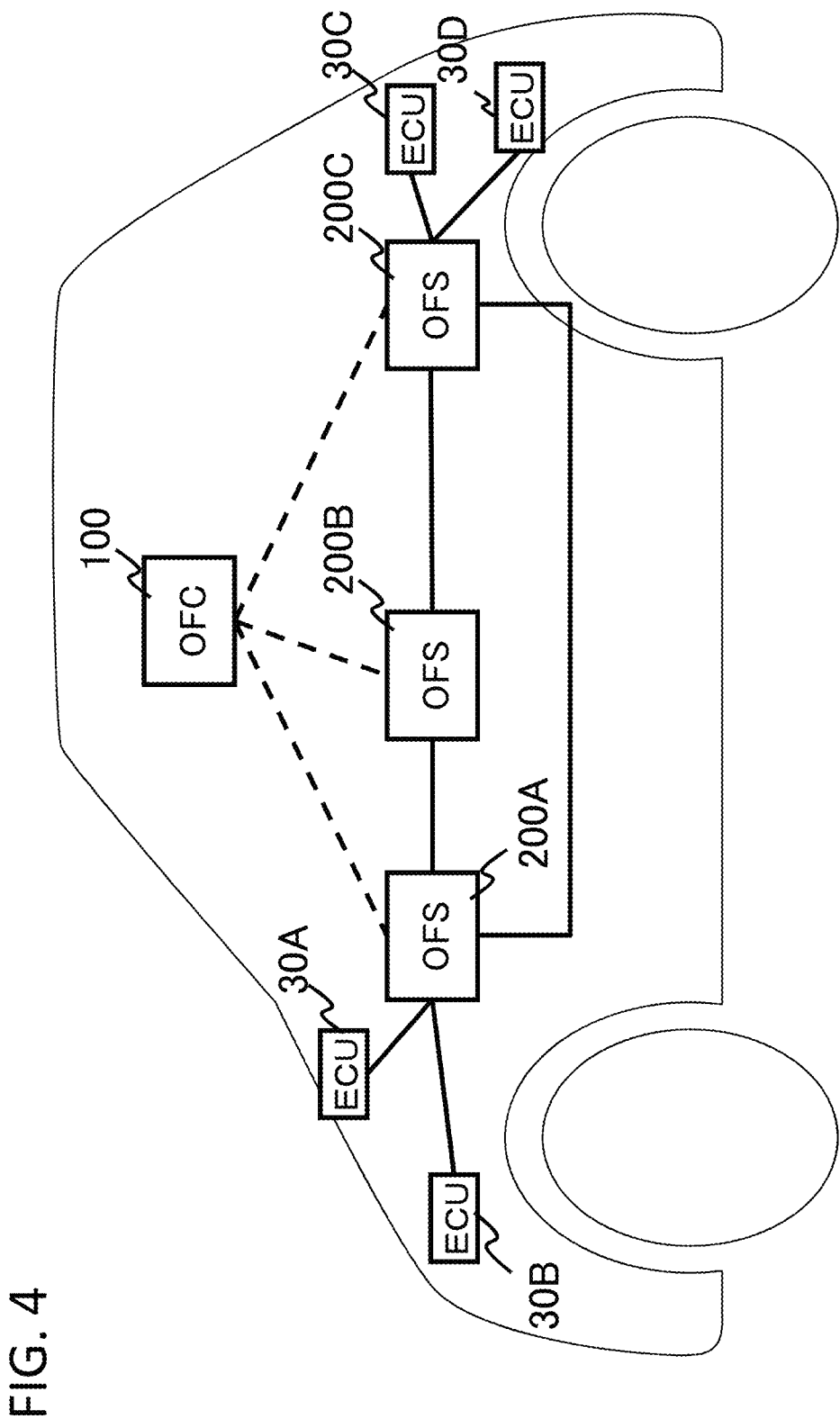
FIG. 4 is a diagram illustrating a configuration of an in-vehicle communication system in a first exemplary embodiment of the present invention.

Successively, it will be described about a first exemplary embodiment of the present invention by referring to figures in detail. FIG. 4 is a diagram illustrating a configuration of an in-vehicle communication system in the first exemplary embodiment of the present invention. As referring to FIG. 4, a configuration in which an OpenFlow controller (OFC) 100 and a plurality of OpenFlow switches (OFSs) 200A to 200C are arranged in a vehicle is illustrated. Further, hereinafter, it is referred to as an "OFS 200" as far as it is not necessary to distinguish the OpenFlow switches 200A to 200C especially.

The OFC 100 is a device equivalent to an OpenFlow controller described in Non-Patent Literature 1, and corresponds to the above control apparatus 10A.

The OFS 200 selects a communication path and realizes communication between ECUs 30 or communication between the ECU 30 and a sensor in accordance with a flow entry set from the OFC 100. In an example of FIG. 4, the OFS 200 is connected in a ring fashion. In addition, in this way, by connecting the OFS 200 in the ring fashion, it is possible to utilize a bypass path, being not via a link, as a backup path when a path is switched according to a flow type or failure has occurred in a link between any of the switches.

The OFC 100 and OFS 200 are connected via a control channel illustrated by broken lines of FIG. 4.

The ECU 30 is a device which controls each part of the vehicle such as an engine, electric motor, battery, transmission gear, or the like, for example. The ECU 30 performs an operation of transmitting information to a destination according to a type at a frequency according to a data type. In addition, it is assumed that the ECU 30 corresponds to any of a CAN or Ethernet in the present exemplary embodiment.

Figure 5:
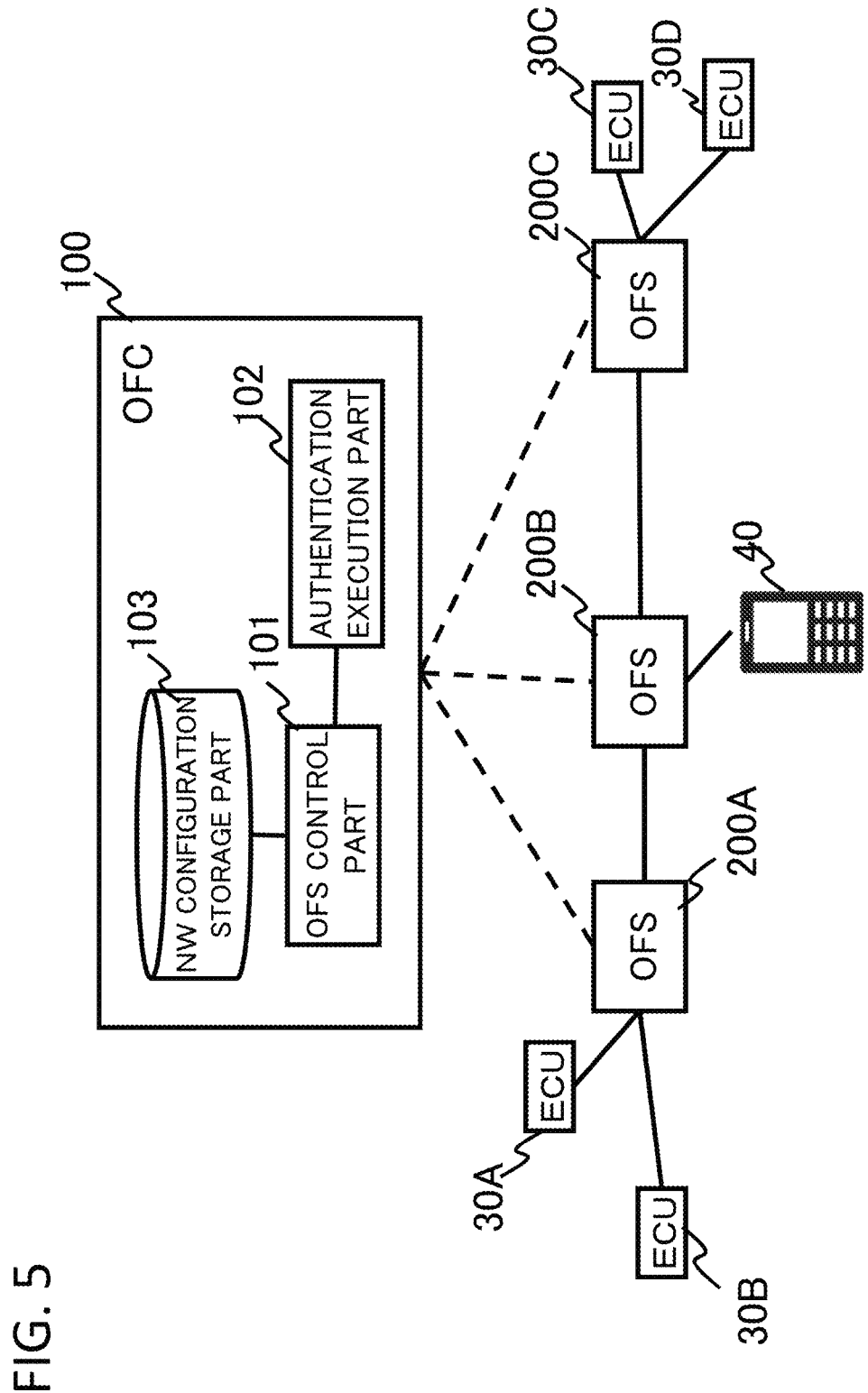
FIG. 5 is a diagram illustrating a schematic configuration of an in-vehicle communication system in the first exemplary embodiment of the present invention.

Successively, it will be described about a configuration of the OFC 100 realizing the communication between the above ECUs 30 by referring to figures in detail. FIG. 5 is a diagram illustrating schematic configuration of the in-vehicle communication system in the first exemplary embodiment of the present invention. The OFC 100 in FIG. 5 includes an OFS control part 101, authentication execution part 102, and network configuration storage part (NW configuration storage part) 103.

The NW configuration storage part 103 stores information of connection relation of the plurality of OFSs 200 and information of the ECU, the sensor, or the like connected to each the OFS. When there is a difference in communication band ranges (data transfer speed) in a link between the OFSs 200, the NW configuration storage part 103 may hold the information. Herewith, it is possible to cause the OFC 100 to calculate a path that can secure a required communication band range (data transfer speed) for communication between the ECU 30 and a device 40.

The OFS control part 101 generates a flow entry realizing the communication between the ECUs 30 by referring to the NW configuration storage part 103 and sets it to the OFS 200. Further, the OFC 100 needs not to generate the flow entry on each occasion and some of the flow entries may be set at the time the vehicle is shipped. On the other hand, when any trouble of a device or OFS has occurred, the OFC 100 may set an alternate path of the OFS control part 101 or a path for a predetermined backup to the ECU dynamically. Since a basic operation of these the OFC 100 and OFS 200 is described in Non-Patent Literature 1, explanation is omitted.

The authentication execution part 102 communicates with the predetermined device 40 and executes an authentication processing which confirms whether or not the device 40 is a legitimate device. In addition, as a method of the authentication processing by the authentication execution part 102, similarly to the authentication execution part 12A, various methods such as a method or the like using biological information or terminal unique information of another terminal other than input of a PIN code or input of pair of a serial number and password can be used.

Successively, it will be described about an operation of the present exemplary embodiment by referring to figures in detail. In the following explanation, it will be described under an assumption that a connector for diagnosis of the vehicle is connected to the OFS 200B, various type of a tester or a diagnosis tool is connected to the connector, and communication with a target ECU is attempted. In addition, a standard of OBD (On board Diagnosis), OBD2 (OBD second generation), or the like is known as the connector for diagnosis of the vehicle, but it is not limited to these standards.

For example, as illustrated in a lower part in FIG. 5, it is assumed that the device 40 is connected to the OFS 200B, transmits a request for diagnosis communication to the ECU 30B, and attempts communication with the ECU 30B. Since the OFS 200B does not hold a flow entry matching to a packet received from the device 40, the OFS 200B reports occurrence of a new communication to the OFC 100.

Figure 6:
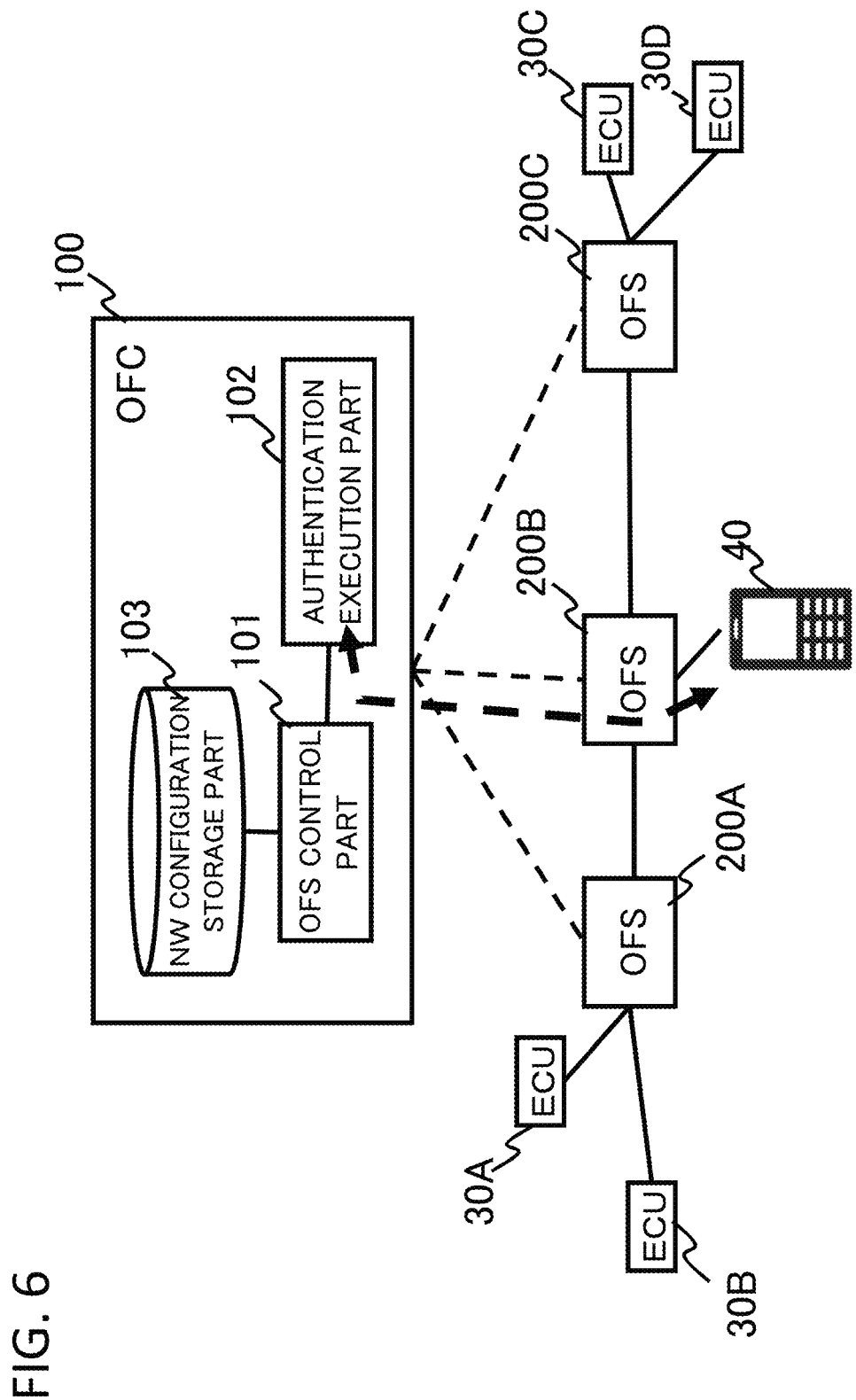
FIG. 6 is a diagram for explaining an operation of the first exemplary embodiment of the present invention.

The OFC 100 received the report sets a communication path between the device 40 and authentication execution part 102 and causes the authentication execution part 102 to execute the authentication processing to the device 40, as illustrated in FIG. 6. Similarly to the control apparatus 10A, when authentication is in failure here, the OFC 100 does not set a flow entry realizing a communication between the device 40 and ECU 30B. Herewith, it is possible to prevent that an illegal device transmits a packet or the like to a network in the vehicle.

As a result of the authentication, when the authentication of the device 40 is successful, the OFC 100 refers to information of the NW configuration storage part 103 and calculates a path(s) between the device 40 and ECU 30B. Here, it is assumed that the path via the OFS 200A and 200B is calculated. Next, the OFC 100 sets a flow entry causing to transfer the communication between the device 40 and ECU 30B to the OFS 200A and 200B on the path. It is preferable that information to specify the communication for diagnosis between the device 40 and ECU 30 is set as a match condition of the flow entry. As an example of this information, there may be each communication address of the device 40 and ECU 30B, or specified information included in a UDS frame.

Figure 7:
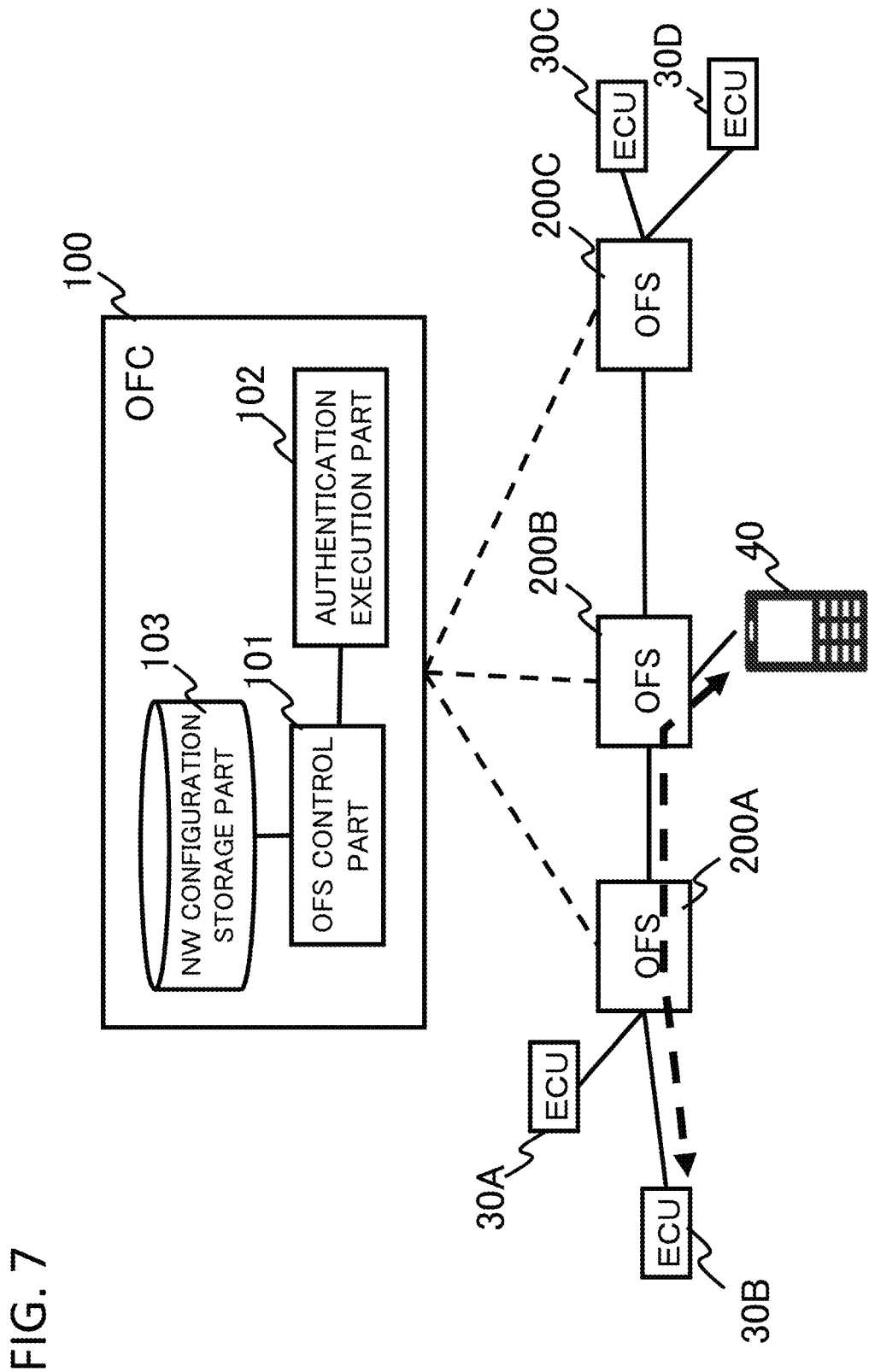
FIG. 7 is a diagram for explaining an operation of the first exemplary embodiment of the present invention.

As a result, as illustrated in FIG. 7, it is possible that the device 40 communicates with the ECU 30B and executes the diagnosis. As a protocol of the diagnosis herein, there are UDS (Unified Diagnosis Services, ISO14229), Diagnostics on CAN (ISO15765), and the like. In addition, some of the ECU of a communication destination may require protocol conversion. In this case, a flow entry performing conversion of a CAN frame and Ethernet frame exemplified in Non-Patent Literature 1 may be set to the OFS 200.

Further, the flow entry set by the above process needs not be permanent, since the flow entry is for realizing the communication for diagnosis by the device 40. For example, an appropriate time out value may be set to these flow entries, or the OFC 100 may perform an operation of deleting the flow entry onto the OFS 200 explicitly after a predetermined time period has elapsed. Therefore, these flow entries correspond to the temporary control entry regardless of setting the time out.

Further, since a mechanism of an OpenFlow is used in the present exemplary embodiment, it is possible to execute the diagnosis by a plurality of devices in parallel as far as contention of communication, that is, contention of the match condition of the flow entry does not occur. For example, it is assumed that another device 40B be connected to the OFS 200B in order to perform a diagnosis of the ECU 30C during the diagnosis of the ECU 30B by the device 40. In this case, since the OFS 200B does not hold a flow entry matching to a packet received from the device 40B, the OFS 200B reports occurrence of a new communication to the OFC 100 similarly.

Figure 8:
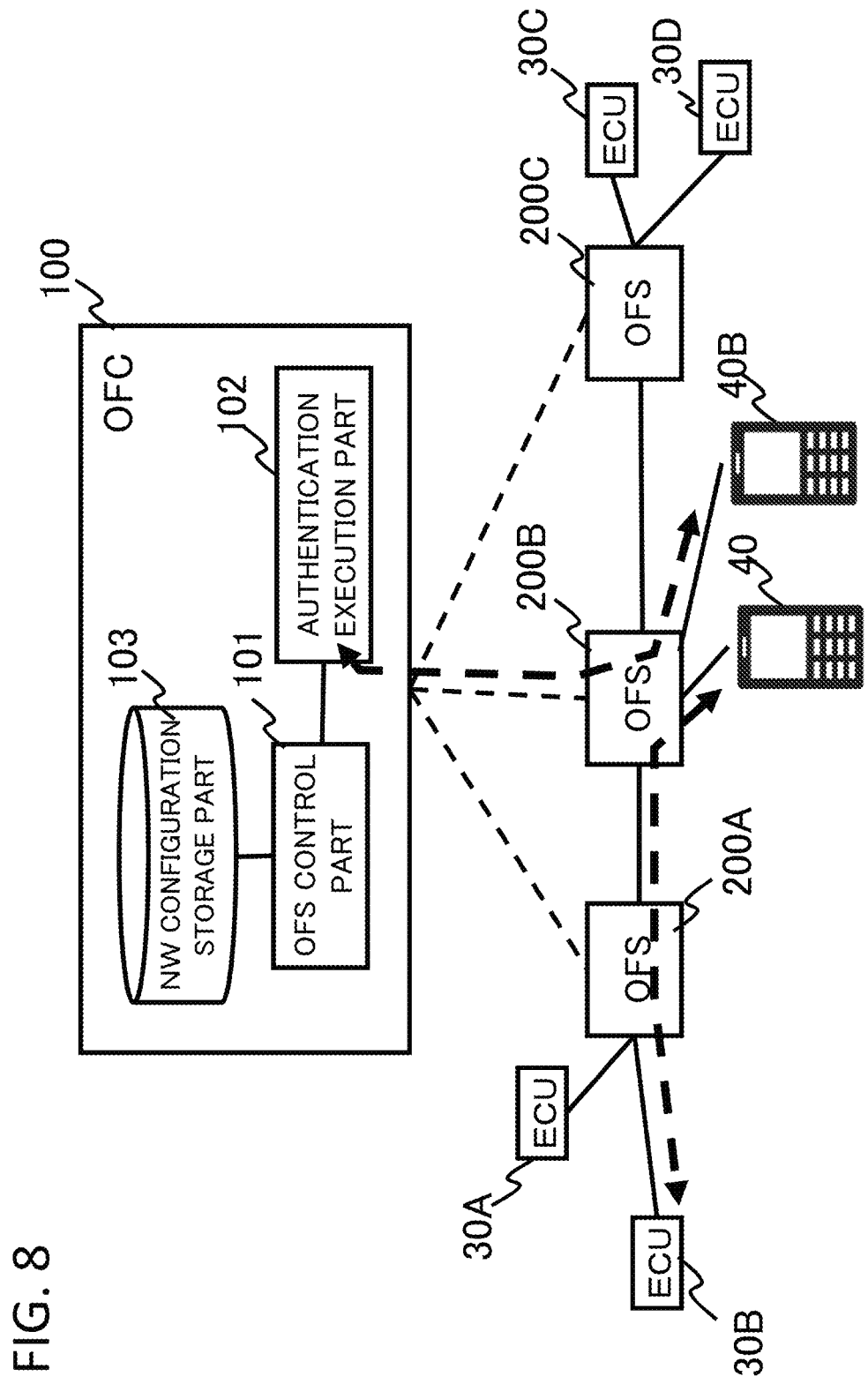
FIG. 8 is a diagram for explaining an operation of the first exemplary embodiment of the present invention.

As illustrated in FIG. 8, the OFC 100, upon receipt of the report, sets a communication path between the device 40B and authentication execution part 102 and causes the authentication execution part 102 to execute an authentication processing to the device 40B.

As a result of the authentication, when the authentication of the device 40B is successful, the OFC 100 refers to information of the NW configuration storage part 103 and calculates a path(s) between the device 40B and ECU 30C. Here, it is assumed that the path via OFS 200B and 200C is calculated. Next, the OFC 100 sets, to the OFS 200B and 200C on the path, a flow entry causing to transfer a communication between the device 40B and ECU 30C. In this way, by setting the flow entry having a match condition different from an existing flow entry, it is possible to divide and handle logically UDS communication whose ECU 30 is different at least.

Figure 9:
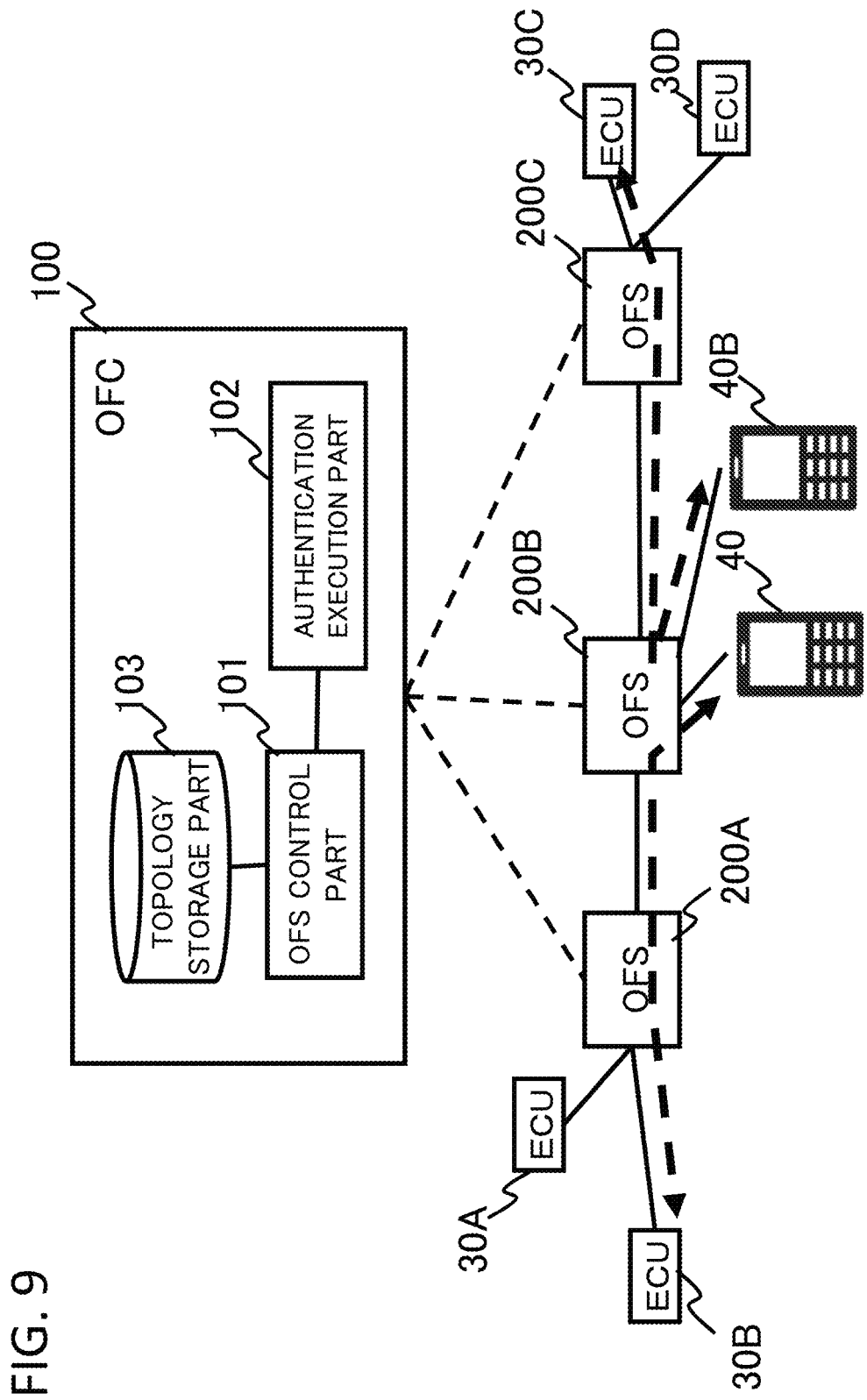
FIG. 9 is a diagram for explaining an operation of the first exemplary embodiment of the present invention.

As a result, as illustrated in FIG. 9, it is possible that the device 40B communicates with the ECU 30C and executes diagnosis. In the OFS 200B, similarly to general operations of the OFS, it is possible to process a diagnosis packet between the device 40 and ECU 30B and a diagnosis packet between the device 40B and ECU 30C at the same time by referring to the flow entry. Therefore, according to the present exemplary embodiment, it is possible to significantly shorten the period required to the diagnosis. The reason resides in that a configuration being capable to execute the diagnosis of the plurality of ECUs 30 in parallel is adopted.

Further, in examples of FIG. 8 and FIG. 9, for convenience of explanation, though two devices of the devices 40 and 40B are illustrated, it is possible to execute the diagnosis of the plurality of ECUs at the same time by one of the device, according to the present exemplary embodiment. In this sense, it is possible to significantly shorten the period required to the diagnosis in the present embodiment.

Second Exemplary Embodiment

Figure 10:
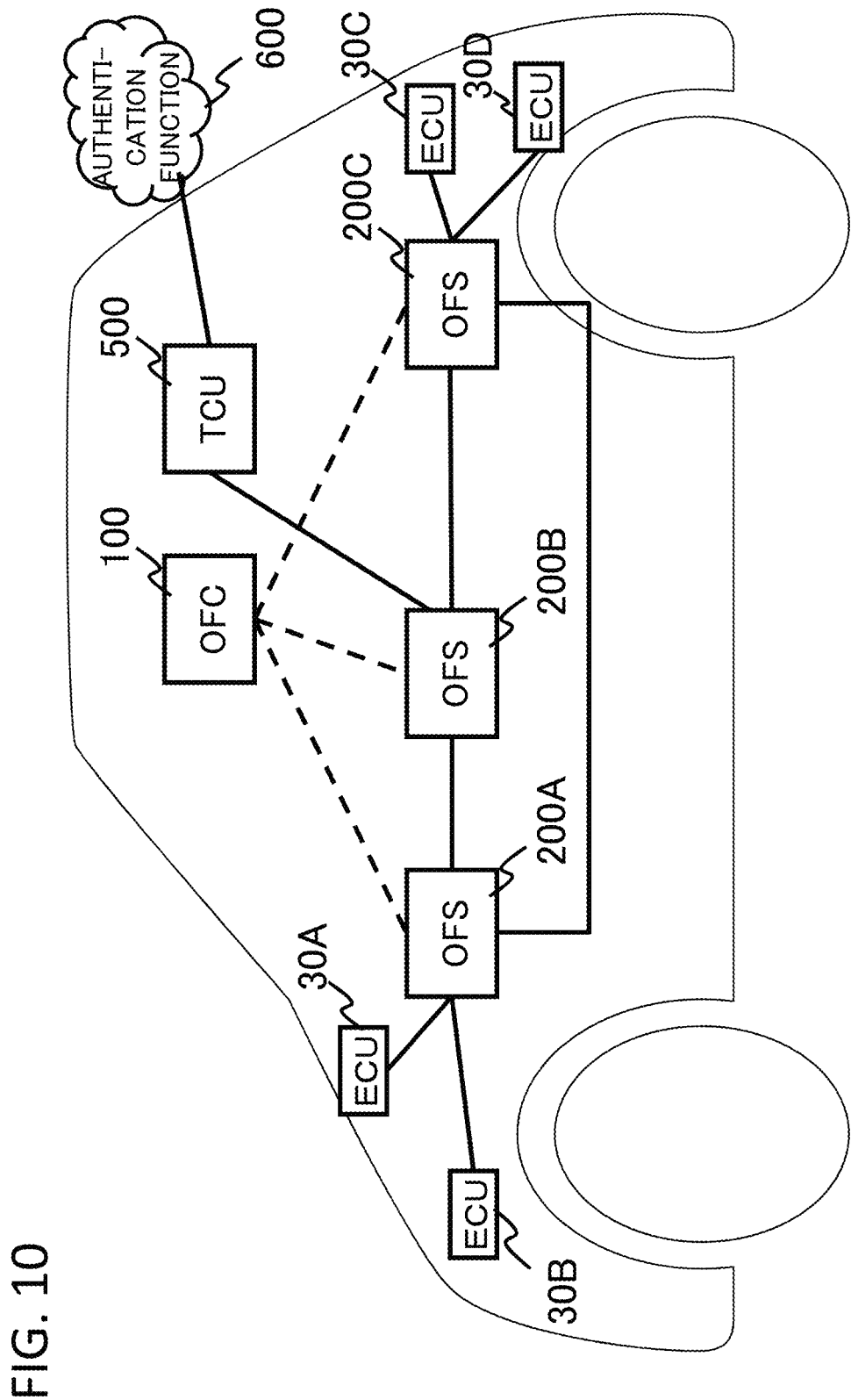
FIG. 10 is a diagram illustrating a configuration of an in-vehicle communication system in a second exemplary embodiment of the present invention.

Successively, it will be described about a second exemplary embodiment executing an authentication processing in cooperation with an authentication function arranged in a cloud side, by referring to figures in detail. FIG. 10 is a diagram illustrating configuration of an in-vehicle communication system in the second exemplary embodiment of the present invention. A different point from the first exemplary embodiment illustrated in FIG. 4 is a point that a TCU (Tele-Communication Unit) 500 is connected to an OFS 200B and a connection to an authentication function 600 of the cloud side via the TCU 500 is possible. Since another configuration is similarly to the first exemplary embodiment, explanation is omitted.

Figure 11:
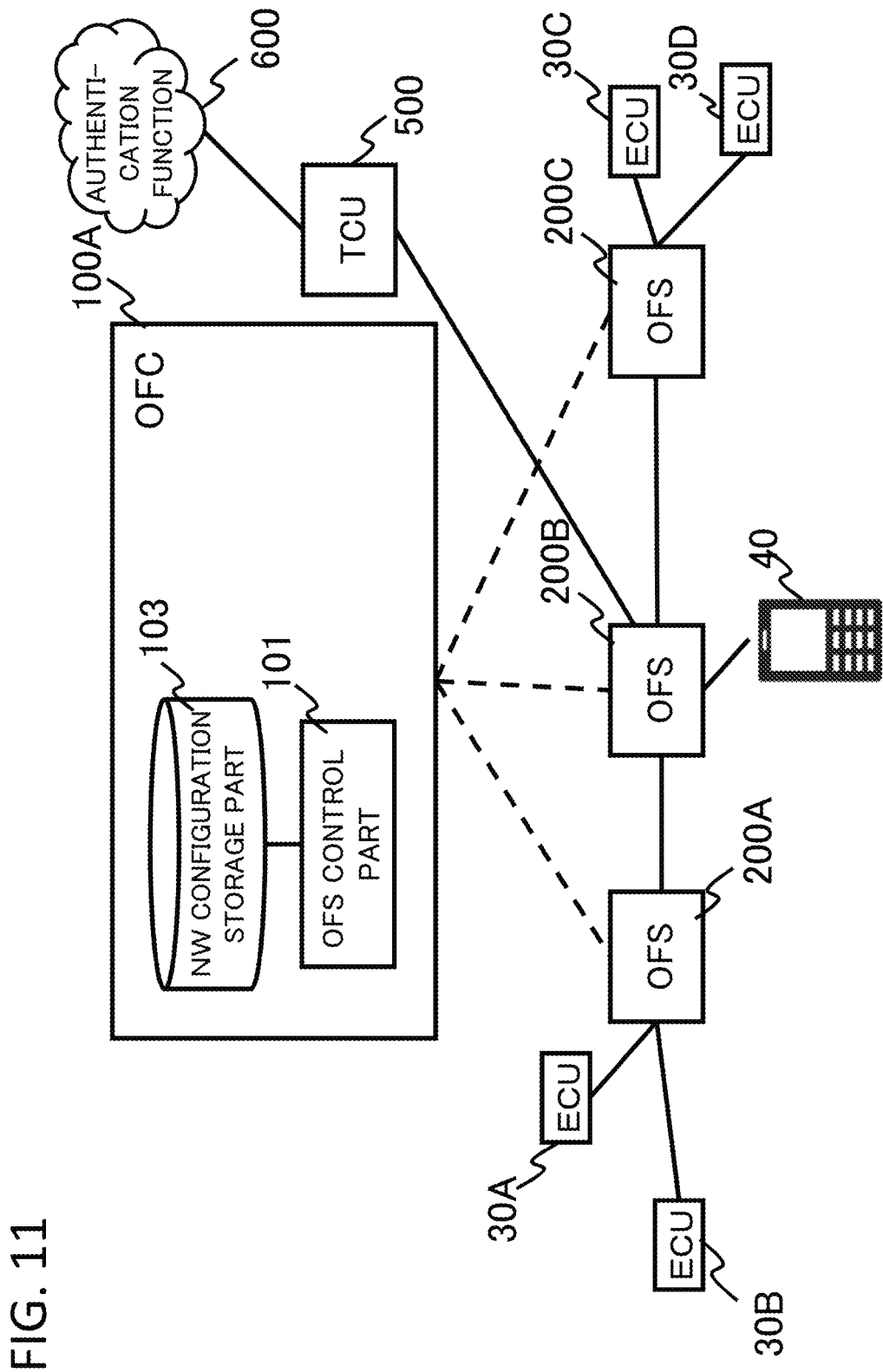
FIG. 11 is a diagram illustrating a schematic configuration of an in-vehicle communication system in the second exemplary embodiment of the present invention.

FIG. 11 is a diagram illustrating schematic configuration of the in-vehicle communication system in the second exemplary embodiment of the present invention. A different point from the configuration illustrated in FIG. 5 is a point that the authentication execution part is omitted in an OFC 100A. Since another configuration is similarly to the first exemplary embodiment, hereinafter, it will be mainly described a different point in the operation of the first exemplary embodiment.

For example, as illustrated in lower part in FIG. 11, it is assumed that a device 40 attempts to connect to an OFS 200B and perform a communication with an ECU 30B. Since the OFS 200B does not hold a flow entry matching to a packet received from the device 40, the OFS 200B reports occurrence of a new communication to the OFC 100A.

Figure 12:
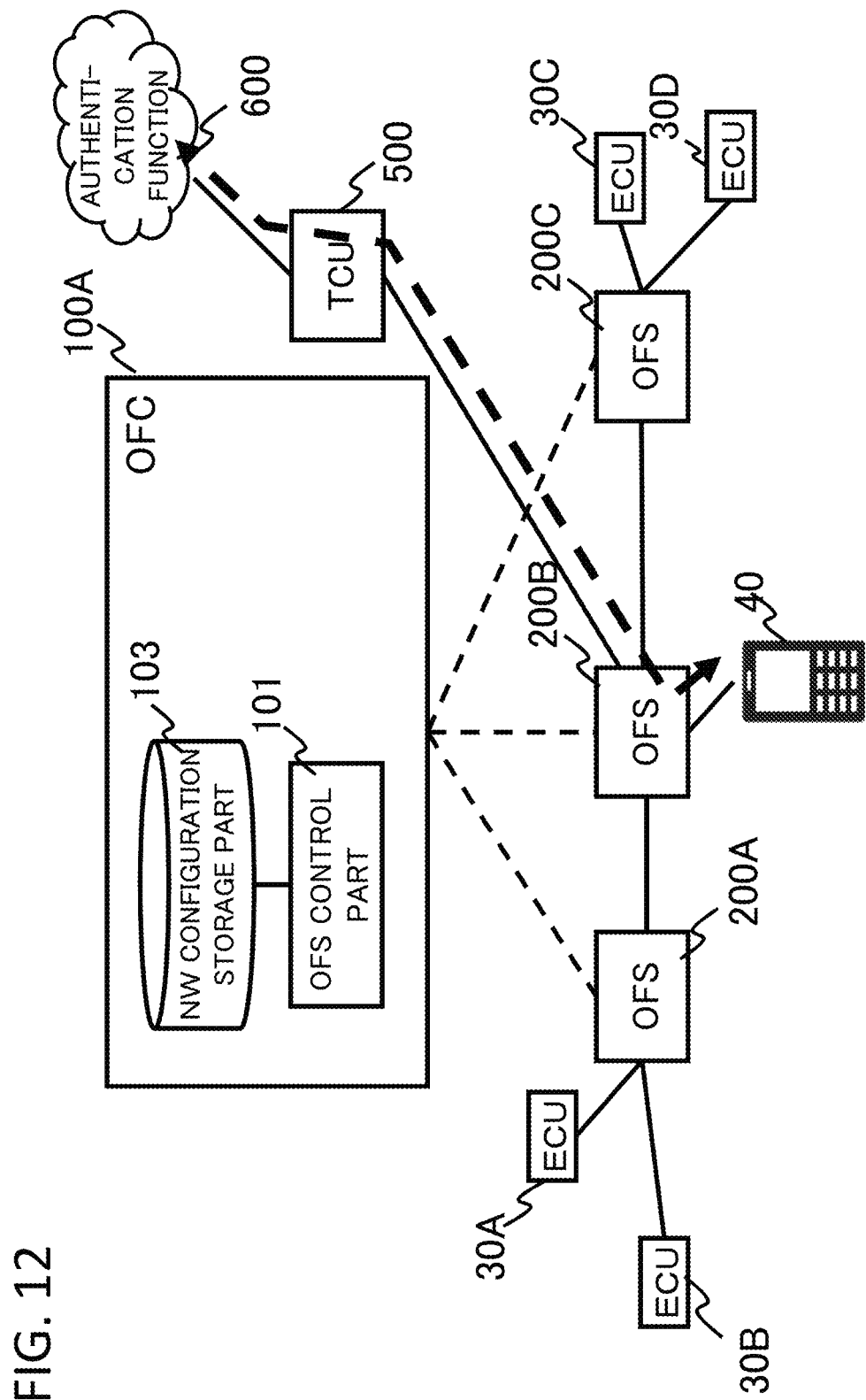
FIG. 12 is a diagram for explaining an operation of the second exemplary embodiment of the present invention.

As illustrated in FIG. 12, the OFC 100A, upon receipt of the report, sets a communication path between the device 40 and the authentication function 600 of the cloud side and causes the authentication function 600 of the cloud side to perform an authentication processing onto the device 40. Here, the authentication function 600 of the cloud side functions as a predetermined authentication apparatus, and receives information of a device and transmits an authentication result according to a request from the device 40. Similarly to the control apparatus 10, when authentication is in failure, the OFC 100A does not set a flow entry realizing a communication between the device 40 and the ECU 30B of the cloud side. Herewith, it is possible to prevent that an illegal device transmits a packet or the like to a network in a vehicle.

On the other hand, as a result of the authentication, when the authentication of the device 40 is successful, the OFC 100A refers to information of a NW configuration storage part 103 and calculates a path between the device 40 and ECU 30B, similarly to the first exemplary embodiment. Next, the OFC 100A sets, to an OFS 200A and the OFS 200B on the path, a flow entry causing to transfer the communication between the device 40 and ECU 30B. Further, the authentication result may be transmitted from the authentication function 600 of the cloud side to the OFC 100A directly. In addition, as another exemplary embodiment, a configuration that the authentication function 600 of the cloud side transmits the authentication result to the device 40 once and the device 40 presents the authentication result to the OFC 100A may be adapted.

Figure 13:
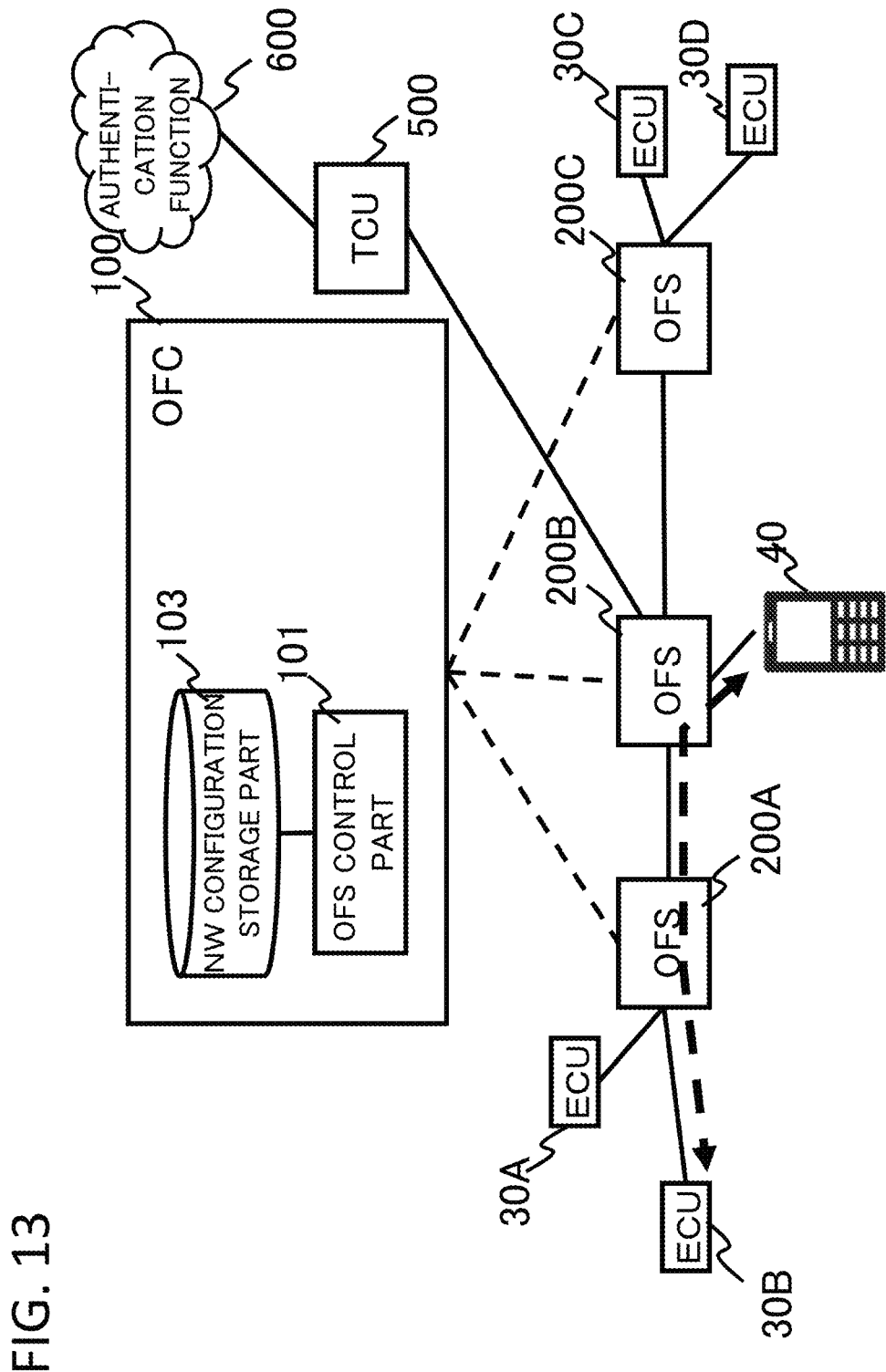
FIG. 13 is a diagram for explaining an operation of the second exemplary embodiment of the present invention.

As a result, as illustrated in FIG. 13, it is possible that the device 40 communicates with the ECU 30B and executes diagnosis. Further, in the present exemplary embodiment, similarly to the first exemplary embodiment, it is possible that the device 40 executes authentication of another device during that the device 40 communicates with the ECU 30B and allows communication between the other device and an ECU.

As described above, also in the present embodiment, it is possible to achieve both efficiency of diagnosis and reprogramming of the ECU and reduction of a security risk.

In addition, though explanation is omitted in the second exemplary embodiment, even when a TCU 500 is connected newly, the TCU 500 may perform an authentication processing. In this case, it is considered that the authentication execution part 102 of the OFC 100 in the first exemplary embodiment is added to the OFC 100A.

Though each exemplary embodiment of the present invention is described, the present invention is not limited to the above exemplary embodiments, and it possible to add further modification, replacement, and adjustment within not deviating from technical idea of the present invention. For example, a network configuration, a configuration of each element, and an expression form of a message illustrated in each figure are examples to facilitate the understanding of the present invention, and are not limited to the configurations illustrated in these figures. Further, in the following description, "A and/or B" is used in the sense of at least any one of A and B.

In addition, though it is descried that the authentication execution part 12A and 102 is a machine of performing the authentication processing onto the device 40 in the above exemplary embodiment, when an authentication function is in the ECU 30 side, it is possible to adopt a configuration using the authentication function. For example, when a SEED request for security authentication is transmitted from the device 40, a control apparatus or OFC transfers the SEED request to the ECU 30. And, when a response to the SEED request is performed from the ECU 30, the control apparatus or OFC transmits back to the device 40. And, when the device 40 calculates a KEY using the SEED and transmits to the ECU 30, the control apparatus or OFC transfers the KEY to the ECU 30. Based on the result, it may determine whether or not the control apparatus or OFC succeeds in authentication. In this case, the authentication execution part 12A and 102 intermediates the authentication processing between the device 40 and ECU 30.

For example, though it is described that the switch(es) in the vehicle is controlled by using the OpenFlow in the above exemplary embodiment, it is possible to realize the present invention by using a method other than the OpenFlow.

Figure 14:
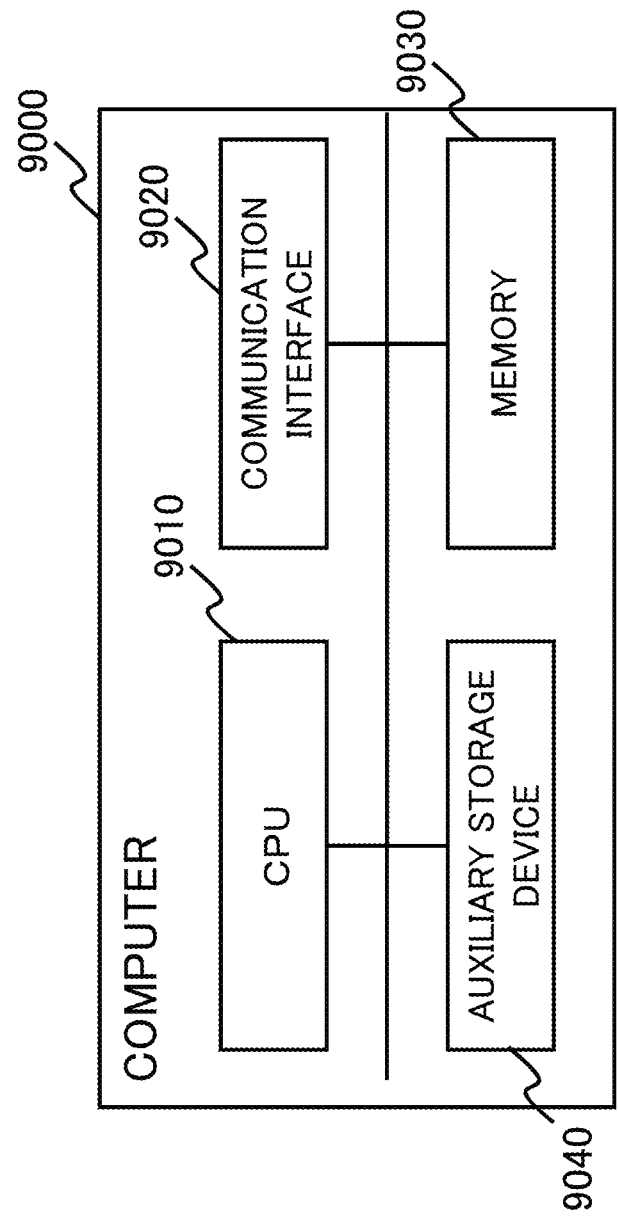
FIG. 14 is a diagram illustrating a configuration of a computer configurating a control apparatus of the present invention.

In addition, procedures described in the above first and second exemplary embodiments are possible to realize by a program causing a computer ("9000" in FIG. 14) functioning as the control apparatus or the OFC to realize functions as these apparatuses. This computer is exemplified as a configuration including a CPU (Central Processing Unit) 9010, communication interface 9020, memory 9030, auxiliary storage device 9040 of FIG. 14. That is, it is enough to cause the CPU 9010 of FIG. 14 to execute a switch control program or authentication processing program and execute an update processing of each calculation parameter held in the auxiliary storage device 9040 or the like.

That is, the each part (processing means, function) of the control apparatus or the OFC described in the above first and second exemplary embodiments can be realized by a computer program causing a processor installed in the control apparatus or the OFC to execute the above each processing by using its hardware.

Finally, preferable Modes of the present invention are summarized.

[First Mode]
(Refer to the control apparatus according to the first aspect.)

[Second Mode]
It is preferable that a device to which a temporary control entry is set by the control apparatus is a tester or Telematics Communication Unit.

[Third Mode]
It is possible to adopt a mode executing the authentication by that the authentication execution part of the above control apparatus transmits information of the device to a predetermined authentication apparatus and receives an authentication result from the predetermined authentication apparatus.

[Fourth Mode]
The control part of the above control apparatus can adopt a configuration permitting communication for multiple pairs of a device and ECU in a range that the communication between the device and ECU of one pair does not contend with the communication between the device and ECU of other pair.

[Fifth Mode]
The control part of the above control apparatus can set a control entry causing to perform protocol conversion between the device and the ECU to the switch, too.

[Sixth Mode]
A device to which a temporary control entry is set by the above control apparatus may be a device which performs a reprogramming processing using a data for update which updates a program of the ECU.

[Seventh Mode]
(Refer to the in-vehicle communication system according to the second aspect.)

[Eighth Mode]
(Refer to the communication control method according to the third aspect.)

[Ninth Mode]
(Refer to the program according to the fourth aspect.)

Further, it is possible that the modes of seventh to ninth are expanded to the modes of second to sixth in the same way as the first mode.

Further, it is regarded that the above patent literatures and non-patent literature are incorporated by reference in the present application. Within the entire disclosure of the present invention (including claims), and based on the basic technical concept, it is possible to change and adjust the exemplary embodiments or examples. Also, various combinations or selections (including partial removal) of different disclosed elements (including each element of each claim, each element of each exemplary embodiment or example, each element of each figure, or the like) within the entire disclosure of the present invention are possible. That is, in the present invention, it is of course natural to include various variations or modifications that could be made by a person skilled in the art according to the entire disclosure including claims and the technical concept. Especially, even if there is no explicit description with respect to any number or a small range included in a numerical range described in the present application, it should be interpreted as such be concretely described in the present application. SIGN LIST

10A control apparatus
11A control part
12A authentication execution part
20, 20A to 20C switch
30, 30A to 30D ECU
40, 40B device
100, 100A OpenFlow controller (OFC)
200, 200A to 200C OpenFlow switch (OFS)
101 OFS control part
102 authentication execution part
103 network configuration storage part (NW configuration storage part)
500 TCU
600 authentication function
9000 computer
9010 CPU
9020 communication interface
9030 memory
9040 auxiliary storage device

The invention claimed is:
1. A control apparatus, comprising:
at least one memory configured to store instructions; and
at least one processor configured to execute the instructions to:
control communication in a vehicle by setting a control entry to a plurality of switches, by referring to the control entry, relaying a packet input to and output from an Electronic Control Unit (ECU) or ECUs installed in the vehicle; and
perform an authentication processing for a device attempting communication with the ECU via any one of the plurality of switches, wherein a temporary control entry realizing the communication between the device and ECU or ECUs is set to the switches when authentication of the device is successful.

2. The control apparatus according to claim 1, wherein the device is a tester or Telematics Communication Unit.

3. The control apparatus according to claim 1, wherein the authentication processing performs the authentication by transmitting information of the device to a predetermined authentication apparatus and receiving an authentication result from the predetermined authentication apparatus.

4. The control apparatus according to claim 1, wherein the control permits communication for multiple pairs of the device and ECU in a range that the communication between the device and ECU of one pair does not contend with the communication between the device and ECU of other pair.

5. The control apparatus according to claim 1, wherein the control sets, to the switch, a control entry causing to perform protocol conversion between the device and ECU.

6. The control apparatus according to claim 1, wherein the device is a device which performs a reprogramming processing using a data for update which updates a program of the ECU.

7. A communication control method in a control apparatus including controlling communication in a vehicle by setting a control entry to a plurality of switches relaying, by referring to the control entry, a packet input to and output from an Electronic Control Unit (ECU) installed in the vehicle, the method comprising:
by the control apparatus,
performing an authentication processing for a device attempting communication with the ECU via any one of the plurality of switches; and
setting, to the switch, a temporary control entry realizing the communication between the device and ECU when authentication of the device is successful.

8. A non-transitory computer readable recording medium, recording a program for causing a computer installed in a control apparatus including controlling communication in a vehicle by setting a control entry to a plurality of switches relaying, by referring to the control entry, a packet input to and output from an Electronic Control Unit (ECU) installed in the vehicle, to execute processes, the processes comprising:
an authentication process of a device attempting communication with the ECU via any one of the plurality of switches; and
a process of setting, to the switch, a temporary control entry realizing the communication between the device and ECU when authentication of the device is successful.

9. The control apparatus according to claim 2, wherein the authentication processing performs the authentication by transmitting information of the device to a predetermined authentication apparatus and receiving an authentication result from the predetermined authentication apparatus.

10. The control apparatus according to claim 2, wherein the control permits communication for multiple pairs of the device and ECU in a range that the communication between the device and ECU of one pair does not contend with the communication between the device and ECU of other pair.

11. The control apparatus according to claim 3, wherein the control sets, to the switch, a control entry causing to perform protocol conversion between the device and ECU.

12. The control apparatus according to claim 3, wherein the device is a device which performs a reprogramming processing using a data for update which updates a program of the ECU.

13. The method according to claim 7, wherein the device is a tester or Telematics Communication Unit.

14. The method according to claim 7, wherein the authentication processing performs the authentication by transmitting information of the device to a predetermined authentication apparatus and receiving an authentication result from the predetermined authentication apparatus.

15. The method according to claim 7, wherein the control permits communication for multiple pairs of the device and ECU in a range that the communication between the device and ECU of one pair does not contend with the communication between the device and ECU of other pair.

16. The method according to claim 7, wherein the control sets, to the switch, a control entry causing to perform protocol conversion between the device and ECU.

17. The method according to claim 7, wherein the device is a device which performs a reprogramming processing using a data for update which updates a program of the ECU.

18. The medium according to claim 8, wherein the authentication process performs the authentication by transmitting information of the device to a predetermined authentication apparatus and receiving an authentication result from the predetermined authentication apparatus.

19. The medium according to claim 8, wherein the process of setting sets, to the switch, a control entry causing to perform protocol conversion between the device and ECU.

* * * * *